United States Patent [19]

Baum

[11] Patent Number: 4,931,124
[45] Date of Patent: Jun. 5, 1990

[54] METHOD OF MAKING VENEER LAMINATE COMPOSITE STRUCTURE

[75] Inventor: Charles S. Baum, St. Clair Shores, Mich.

[73] Assignee: Xylem Technologies, Inc., Traverse City, Mich.

[21] Appl. No.: 915,721

[22] Filed: Oct. 6, 1986

Related U.S. Application Data

[60] Division of Ser. No. 710,869, Mar. 12, 1986, Pat. No. 4,689,257, Division of Ser. No. 710,870, Mar. 12, 1986, Pat. No. 4,615,936, which is a continuation-in-part of Ser. No. 649,215, Sep. 10, 1984, Pat. No. 4,543,284.

[51] Int. Cl.$^5$ ............................................. B32B 31/20
[52] U.S. Cl. ................................... 156/245; 156/255; 156/264; 114/82; 114/357; 114/358; 144/332; 144/346; 144/348; 144/349; 144/352
[58] Field of Search ............... 156/242, 245, 255, 285, 156/62.2, 264; 144/332, 344, 346, 348, 349, 352; 428/106, 438, 537.1, 151, 416, 520; 114/82, 357, 358

[56] References Cited

U.S. PATENT DOCUMENTS

| | | | |
|---|---|---|---|
| Re. 22,687 | 11/1945 | Gramelspacher | 144/256.1 |
| 1,330,804 | 2/1920 | Haskell et al. | 144/381 |
| 2,386,821 | 10/1945 | Tardiff | 114/359 |
| 2,414,125 | 1/1947 | Rheinfrank | 114/358 |
| 2,428,325 | 9/1947 | Collins | 244/133 |
| 2,458,864 | 1/1949 | Lindsay | 144/256.3 |
| 2,625,187 | 1/1953 | Frees, Jr. | 114/359 K |
| 2,728,702 | 12/1955 | Simon et al. | 244/133 |
| 2,830,004 | 4/1958 | Lyons | 144/332 |
| 3,205,111 | 9/1965 | Williamson et al. | 144/348 |
| 4,042,746 | 8/1977 | Hofer | 156/295 |
| 4,204,900 | 5/1980 | Kohn | 144/348 |
| 4,255,221 | 3/1981 | Young | 156/382 |
| 4,271,649 | 6/1981 | Belanger | 428/438 |
| 4,483,267 | 11/1984 | Seemann, III | 114/358 |
| 4,536,427 | 8/1985 | Kohn | 114/358 |
| 4,569,873 | 2/1986 | Robbins | 156/62.2 |
| 4,614,555 | 9/1986 | Smith et al. | 144/332 |

Primary Examiner—Caleb Weston
Attorney, Agent, or Firm—Krass & Young

[57] ABSTRACT

This application relates to composite structures and, more particularly, to a composite or sandwich structure employing sheets of wood veneer.

15 Claims, 3 Drawing Sheets

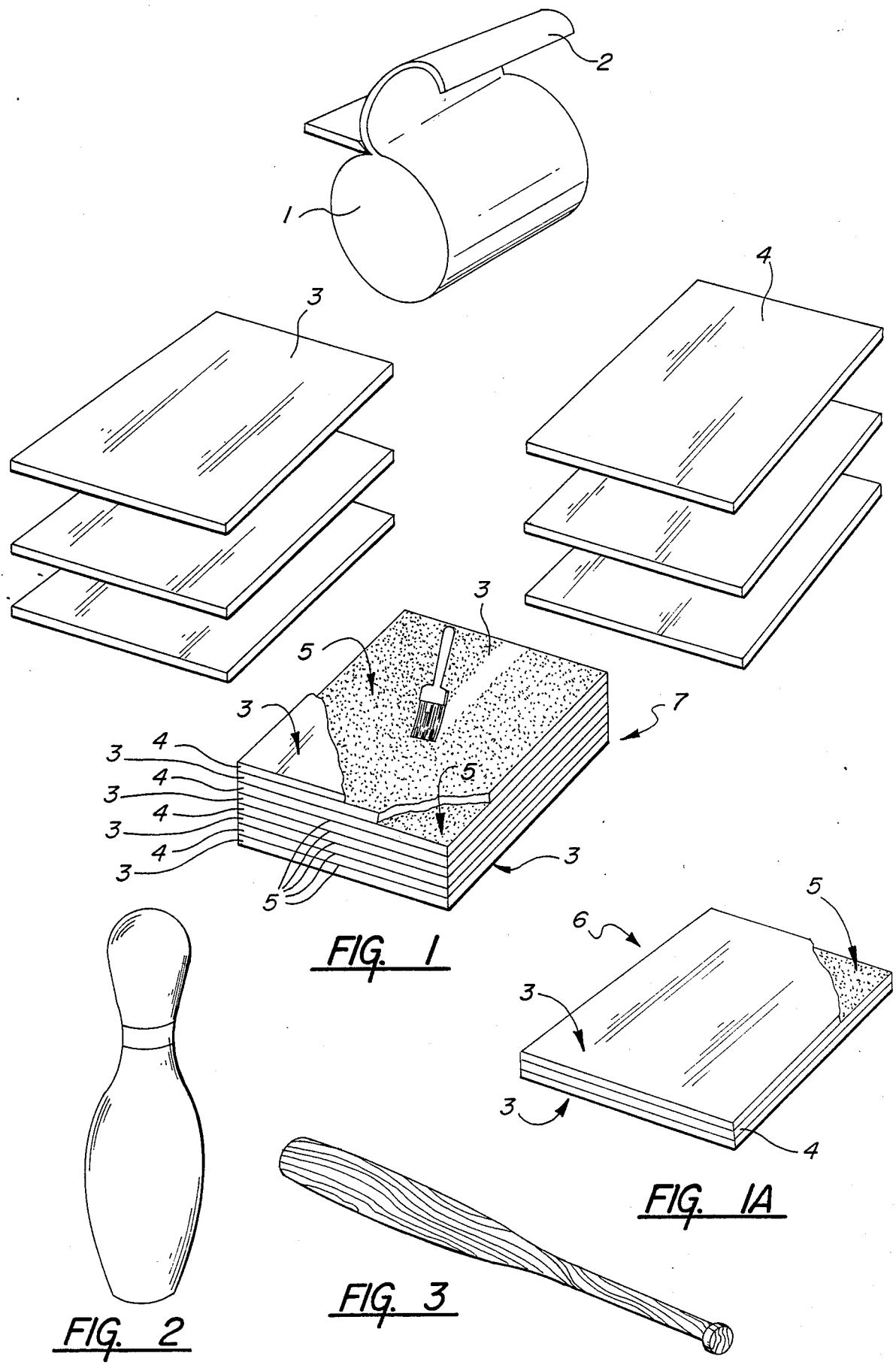

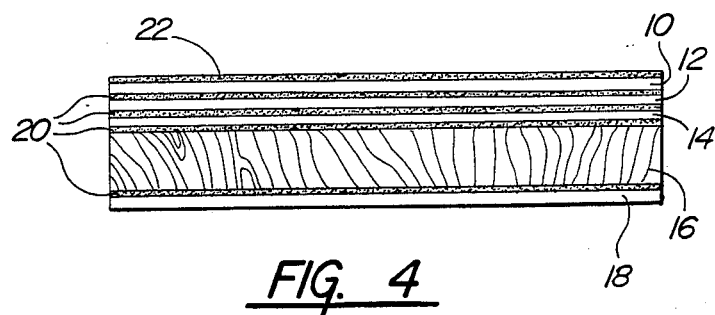
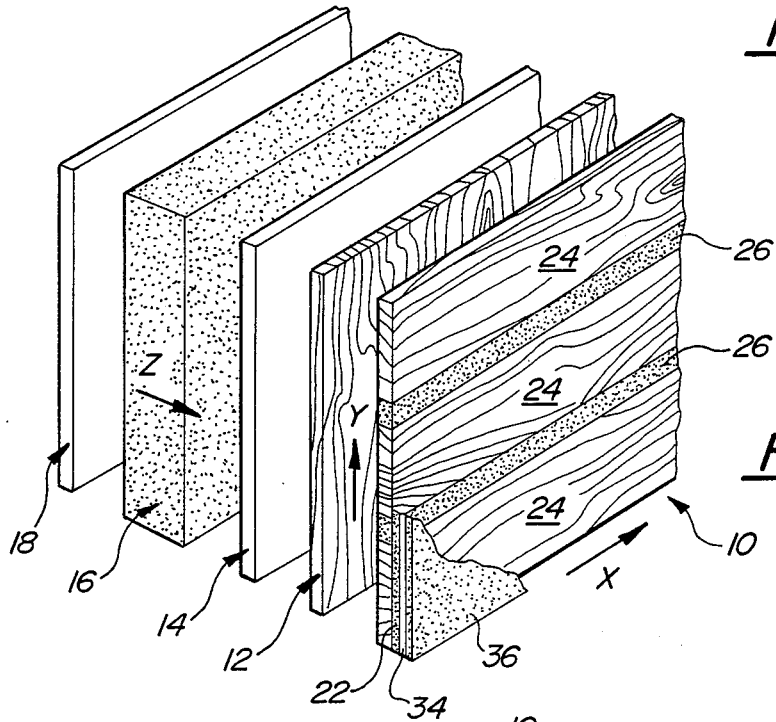
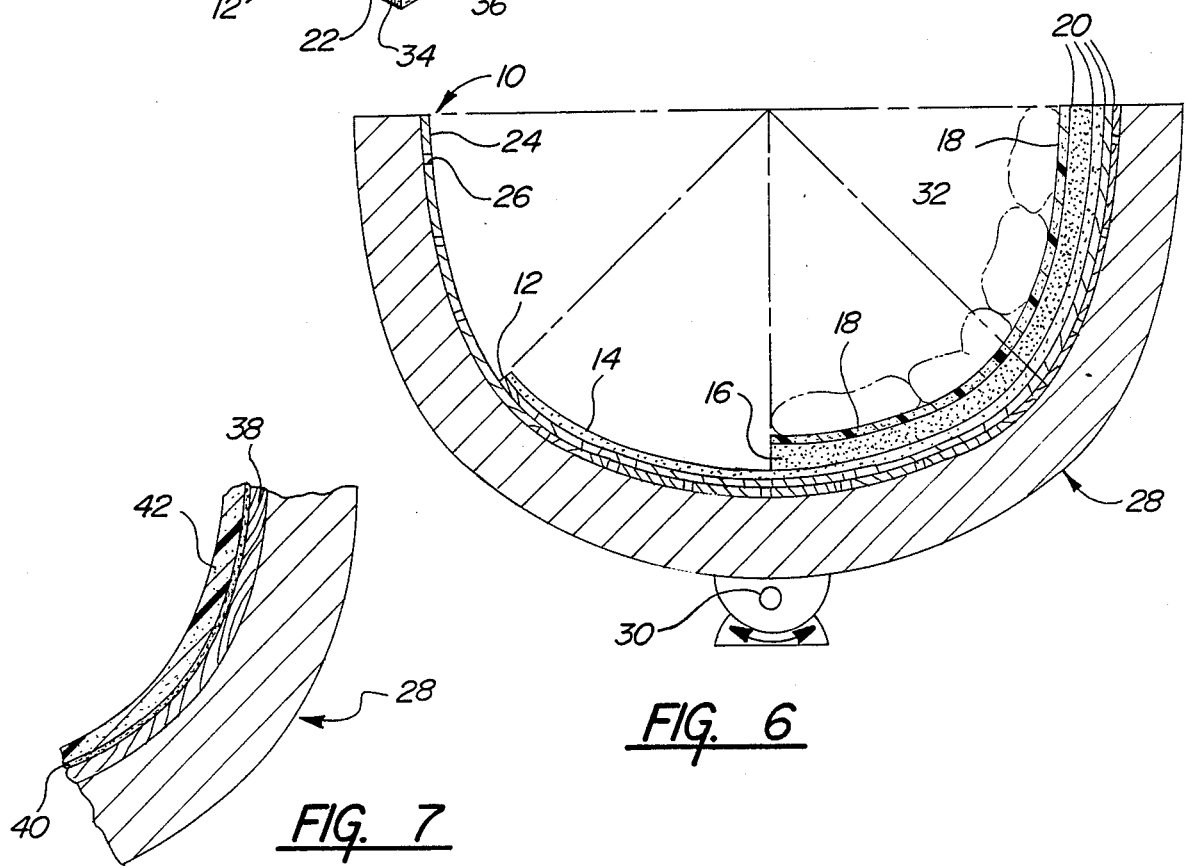

METHOD OF MAKING VENEER LAMINATE COMPOSITE STRUCTURE

RELATED APPLICATION

This application is a division of U.S. patent applications Ser. Nos. 710,869 and 710,870, both filed on Mar. 12, 1986 and both a continuation-in-part of U.S. patent application Ser. No. 649,215, filed on Sept. 10, 1984.

BACKGROUND OF THE INVENTION

This application relates to composite structures and, more particularly, to a composite or sandwich structure employing sheets of wood veneer.

At one time wood accounted for the vast majority of manmade structures. Gradually, however, wood has fallen out of favor in many market areas because of the high maintenance costs and short structure life resulting from rot, paint peeling, instability, swelling and warping. For example, with respect to boats, metals and fiberglass constructions have gradually accounted for the vast majority of boats of every size and description and wood, conversely, has been relegated to use in selected custom applications where initial labor costs and/or maintenance are not controlling factors. However, wood in most respects is an excellent building material due to its stiffness, light weight and fatigue resistance. It's shortcomings are primarily moisture related and these shortcomings are, of course, exacerbated when applied in areas such as the boat building art.

SUMMARY OF THE INVENTION

The present invention concerns a wood veneer laminate composite structure which substantially eliminates the inherent rotting, swelling and warping problems that have traditionally plagued wooden structures while improving upon the inherent structural advantages of wood and retaining the attractive wood appearance.

According to one aspect of the invention, a sheet of processed material is sandwiched between two sheets of wood veneer and resin is interposed between the sheets of the sandwich to firmly bond the sheets together and form a laminate composite structure which presents a natural wood appearance on both exterior surfaces but which, by virtue of the interposed layer of processed material and the overall sealing and binding action of the resin, is structurally superior to natural wood and significantly more resistant to the moisture problems that plague natural wood. The sheet of processed material is preferably fibrous in structure, such for example as fiberglass, and serves to synergistically compliment the sheets of wood veneer. Specifically, the cables or strands of the sheet of fibrous material provide a reinforcing skeleton for the composite structure and provide tensile strength for the composite structure, and the sheets of wood veneer encage or encapsulate the strands of the fibrous sheet to discourage failure of the strands in compression and provide compressive strength for the composite structure. Tests on the composite structure of the invention, using standardized test procedures for sandwich constructions, conclusively establish that the invention sandwich structure is significantly stronger than comparable wood or wood veneer structures or comparable fibrous or fibrous veneer structures.

According to a further aspect of the invention, a method of forming a remanufactured wood sandwich structure is disclosed comprising the steps of peeling a bolt of natural wood in spiral form to form a web of wood veneer; forming the wood veneer web into a plurality of sheets of uniform size; forming a plurality of other sheets, each formed of a material dissimilar to the wood veneer sheets and each having a size corresponding to the size of the wood veneer sheets; and intermixing the wood veneer sheets and the other sheets while interposing resin between the intermixed sheets to form an intermixed stack of sheets with resin interposed between the sheets; and curing the resin to form a remanufactured wood sandwich structure comprising intermixed sheets of wood veneer and other dissimilar sheets bonded together by the resin. This method utilizes all of the wood available in a natural tree trunk, avoiding the high scrappage inherent when the trunks are cut into planks, and provides a material that is superior to natural wood as an engineering structure, that retains the appearance advantages of natural wood, and that is substantially free of the rotting, swelling and warping problems that have typically plagued wooden structures.

According to a further aspect of the invention, a specific wood sandwich structure is disclosed which is especially suitable for use in high moisture environments such as boating building. The wood sandwich structure according to this aspect of the invention includes a sheet of core material having a structure strength running generally normal to the plane of the sheet; a sheet of processed material resin bonded to the sheet of core material; a first sheet of wood veneer resin bonded to the sheet of processed material; and a second sheet of wood veneer resin bonded to the first sheet of wood veneer with its grain crossing with respect to the grain of the first sheet of wood veneer. This construction provides grain strength in the X, Y and Z direction as provided respectively by one of the wood veneer sheets, the other of the wood veneer sheets, and the sheet of core material. The sheet of processed material adds tensile or cable strength and rigidity to the overall structure. This sandwich structure is specially suited for use in boat building wherein the layers are arranged such that the sheet of end core material is on the inside of the boat and the layers of wood veneer are on the outside of the boat so as to provide a rigid and moisture resistant boat hull while preserving the attractive and sought after wood look for the boat hull.

According to a further aspect of the invention, a wood sandwich structure is disclosed which is especially suited for forming concavo-convex structures. According to this aspect of the invention, which is particularly suitable for forming a boat hull for example, a sheet of wood veneer is formed into a concavo-convex configuration; a layer of resin is applied to the concave interior surface of the wood veneer sheet; a sheet of processed material is conformed to the concave inner surface of the wood veneer sheet; and the sheets are bonded together to form a laminated concavo-convex structure with the wood sheet forming the exterior of the structure to provide a wooden appearance to the structure and the sheet of processed material forming the concave interior of the structure and reinforcing the wood sheet to form, together with the wood sheet, an attractive and yet extremely strong concavo-convex structure.

According to a further aspect of the invention, a wood sandwich structure is provided which is especially suitable for use in building trades such as furniture construction. The wood sandwich structure according to this aspect of the invention includes a central sheet of core material having a grain running generally normal to the plane of the sheet; a sheet of processed material resin bonded to each face of the sheet of core material; and a sheet of wood veneer resin bonded to the exposed face of each sheet of processed material. This arrangement provides a wood sandwich structure which is totally symmetrical and therefore extremely resistant to warpge; which has high strength and rigidity and high moisture resistance; and which is otherwise especially suited for use in the furniture manufacturing business. In the disclosed embodiment of this aspect of the invention, the wood sandwich structure further includes a second sheet of wood veneer resin bonded to the exposed face of each sheet of wood veneer with its grain crossing with respect to the grain of the sheet of wood veneer to which it is bonded. This arrangement provides X, Y, Z strength to the wood sandwich while retaining the symmetry, and therefore the warp resistance, of the structure.

According to a further aspect of the invention, a non-planar article of manufacture is formed by forming a wood sandwich structure as disclosed into the non-planar configuration of the article of manufacture. For example, a desk may be formed according to this aspect of the invention by forming the wood sandwich structure into a U configuration with the legs of the U comprising the legs of the desk and the bight of the U comprising the top of the desk.

The invention further comprises a method of forming a boat hull utilizing a wood sandwich structure according to the invention. The invention boat building method comprises forming a mold having a configuration conforming to the shape of the desired boat hull; placing a plurality of strakes of a wood veneer material adjacent the mold surface with the strakes running generally parallel to the center line of the hull and the grain of the strakes extending generally in the plane of the strakes; applying a resin to the exposed surfaces of the strakes; placing a sheet of wood veneer adjacent the strakes with the grain of the sheet extending generally in the plane of the sheet but at cross angles with respect to the grain of the strakes; applying a resin to the exposed surface of the wood veneer sheet; placing a sheet of processed material adjacent the wood veneer sheet; applying a resin to the exposed surface of the sheet of processed material; placing a sheet of core material adjacent the sheet of processed material having a grain strength running in a direction generally normal to the plane of the sheets; applying a resin to the exposed surface of the sheet of core material; placing a further sheet of processed material adjacent the sheet of core material; and pressing the strakes and sheets together to bond them to form a boat hull conforming in shape to the shape of the mold. The boat hull is then removed from the mold and a coating of resin is applied to the exposed surfaces of the strakes to seal those surfaces while preserving the natural wood appearance. The invention method provides a boat hull having superior stiffness and strength characteristics and which retains the appearance and feel of a wooden boat while substantially eliminating the maintenance problems that have been previously plagued wooden boats. The invention method also allows high volume reusable mold techniques to be applied to the construction of wood boats, as opposed to the tedious and labor-intensive custom or kit techniques previously employed in wooden boat construction.

In the various disclosed embodiments of the invention, the sheets of processed material may comprise sheets of triaxial fiberglass and the sheet of core material may comprise a sheet of end grain balsa wood. The wood veneer sheets, the balsa core sheet and the triaxial fiberglass sheets together provide an extremely strong wood sandwich structure and the resin interposed between the various layers adds to the structural strength of the sandwich structure, provides firm bonding between the various sheets, and provides an effective moisture barrier for the wood so that the sandwich structure retains the appearance and stiffness advantages of wood while substantially eliminating the moisture related problems previously associated with a wood structure. Specifically, and as previously discussed, the cables or strands of the fiberglass sheets provide a reinforcing skeleton for the composite structure and provide tensile strength for the structure, and the sheets of wood encage the fiberglass sheets to discourage failure of the cables in compression and provide compressive strength for the composite structure.

BRIEF DESCRIPTION OF THE DRAWINGS

FIG. 1 is a schematic representation of a method of remanufacturing wood according to the invention;

FIG. 1A illustrates a remanufactured wood structure formed by the method of FIG. 1;

FIGS. 2 and 3 illustrate products which may be formed using the remanufactured wood structure produced by the method of FIG. 1;

FIG. 4 is an edge view of a wood sandwich structure according to the invention especially suited for use in boat building;

FIG. 5 is an exploded view of the structure of FIG. 4;

FIG. 6 is a view showing a method and apparatus for building a boat hull utilizing the structure of FIGS. 4 and 5;

FIG. 7 is a fragmentary schematic view showing the use of an invention structure in the formation of a concavo-convex structure such as a boat hull;

DETAILED DESCRIPTION OF THE PREFERRED EMBODIMENT

Figure 8:
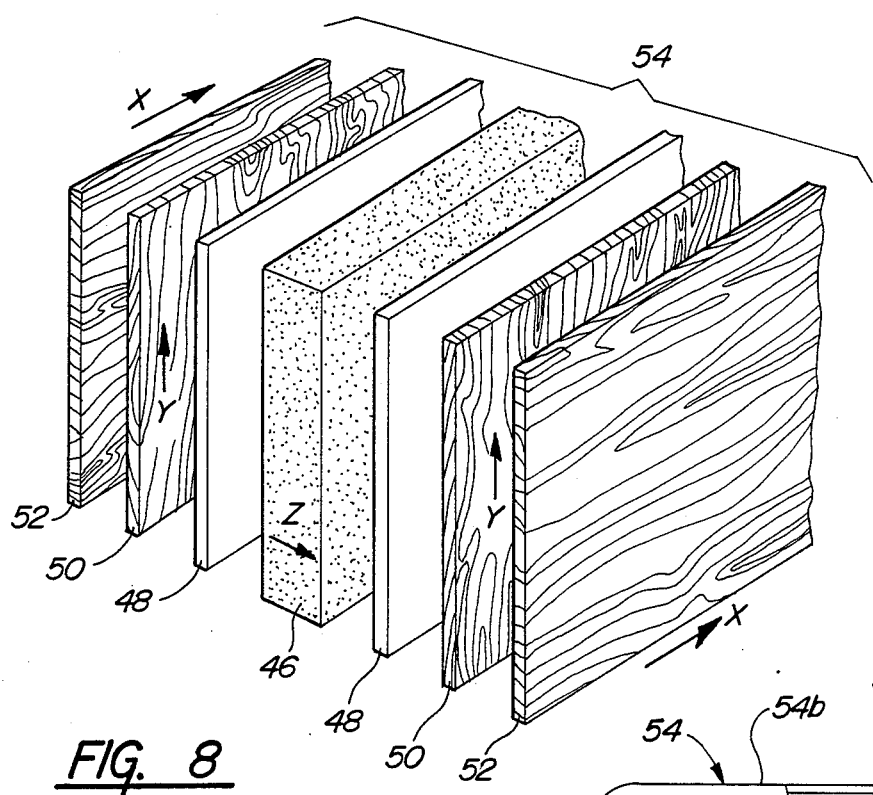
FIG. 8 is an exploded view of a wood sandwich structure according to the invention especially suited for use in furniture manufacture.

The method of remanufacturing wood seen in FIG. 1 comprises the steps of peeling a bolt, such as a log 1, of natural wood in spiral form to form a web 2 of wood veneer; forming the wood veneer web 2, in a suitable cutting operation, into a plurality of sheets 3 of wood veneer; suitably forming a plurality of sheets 4 of processed material having a size corresponding to the size of the wood veneer sheets 3; and bonding alternate sheets of wood veneer 3 and processed material 4 together with a resin 5 to form a wood composite sandwich structure comprising alternate sheets of wood veneer and processed material bonded together by the resin.

In its simplest form, as seen at 6 in FIG. 1A, the remanufactured wood composite sandwich structure may comprise a sheet of processed material 4 sandwiched between two sheets of wood veneer 3 with a resin 5 binding the sheets together to provide a composite wood structure 6 which presents a natural wood appearance on both exterior surfaces.

In a more complex form, and as seen at 7 in the final step in the method of FIG. 1, the remanufactured wood composite sandwich structure may comprises alternate layers of wood veneer 3 and processed material 4 bonded together by resin 5 to form a multi-ply composite structure with wood veneer sheets 3 on both exterior surfaces.

Remanufactured wood sandwich structure 7 is suitable for use in most applications where natural wood has heretofore been used, such for example as in the manufacture of bowling pins, as seen in FIG. 2, or in the manufacture of baseball bats, as seen in FIG. 3.

The remanufactured wood sandwich structure of the invention, whether in its simplest form as represented by structure 6 of FIG. 1A or in its more complex form as represented by structure 7 of FIG. 1, retains, and in fact improves significantly upon, the appearance, stiffness, light weight, and fatigue resistant advantages of natural wood while substantially eliminating the inherent rotting, swelling and warping problems that had traditionally plagued wooden structures. The remanufactured wood sandwich structure of the invention, by virtue of the compressive strength provided by the wood veneer sheets, the tensile and reinforcing strength provided by the fibers of the sheets of processed material, and the unity strength provided by the resin, is stronger in all critical measurable respects than natural wood or other sandwich or unitary structures of comparable size or weight. The thickness of the wood veneer sheets and processed sheets employed to form the remanufactured wood sandwich structure 6 or 7 will vary with the intended application. Wood veneer thicknesses of 0.0625 inches and processed sheet thicknesses of 0.0500 inches have been found to produce a superior structure for most applications.

The wood veneer sheets 3 may be formed, for example, from African mahogany. The sheets 4 of processed material may take various forms including sheets of carbon impregnated glass or sheets of woven nylon fiber. Preferably, sheets 4 comprise triaxial fiberglass sheets having fibers oriented at 0°, 45° and 90°. Triaxial fiberglass of this type is typically provided in roll form with the strands running in the direction of the length of the roll being unbroken through the entire length of the roll. Resin 5 preferably comprises a clear liquid epoxy resin specifically designed to wet-out wood fiber. Such a resin is available, for example, from Gougeon Brothers, Inc. of Bay City, Mich. as WEST SYSTEM 105 Epoxy Resin and WEST SYSTEM 205 Hardener. In the invention composite structure, the unbroken cables or strands of the sheets of fiberglass provide a reinforcing skeleton for the structure and provide tensile strength for the structure, and the sheets of wood veneer encage or encapsulate the strands of the fiberglass sheets to discourage failure of the strands in compression and provide compressive strength for the composite structure. The identified resin and hardener fill the voids and irregularities in the confronting surfaces of the various sheets and effectively lock the sheets together. The resin and hardener also penetrate the surfaces of the sheets to a depth of, for example, between 0.005 and 0.015 inches and thereby add measurably to the overall strength of the composite structure. The invention composite thus derives reinforcing and tensile strength from the unbroken strands or cables of the fiberglass, derives compressive strength from the wood veneer sheets, and derives overall unity strength from the bonding and penetrating effect of the resin.

FIGS. 4 and 5 show a wood sandwich structure according to the invention that is particularly suitable for boat construction. The veneer laminate composite structure of FIGS. 4 and 5 include a first sheet of wood veneer 10, a second sheet of wood veneer 12, a sheet of processed material 14, a sheet of core material 16, and a further sheet of processed material 18. A resin layer 20 is interposed between each of the sheets to bond the sheets together and a coating of resin 22 is applied to the exposed surface of wood veneer sheet 10.

As with the remanufactured wood sandwich structure of FIG. 1, the wood veneer sheets 10 and 12 may comprise African mahogany, the sheets of processed material 14 and 18 may comprise triaxial fiberglass sheets having fibers orientated at 0°, 45° and 90°, and the resin employed for the interposed layers 20 as well as for the finish coating 22 may comprise WEST SYSTEM 105 Epoxy Resin and WEST SYSTEM 205 Hardener. The sheet of core material 26 may take various forms including aluminum honeycomb, paper core honeycomb, or any sheet material having a structure strength running in a direction generally normal to the plane of the sheet. Preferably, sheet 16 comprises a sheet of end grain balsa wood.

As seen in FIG. 5, the outer wood veneer sheet 10 may comprise an assembly of longitudinal planks or strakes 24 separated by a series of narrow strips 26 of any suitable black wood such as black walnut or black ebony. The grain of wood veneer strakes 24 preferably extends generally lengthwise of the strakes. Wood veneer sheet 12 has a grain extending in the plane of the sheet but at cross angles with respect to the grain of strakes 24. The primary grain of core sheet 16, whether it comprise the preferred end core balsa or a suitable honeycomb material, provides grain strength running in a direction generally normal to the plane of sheets 10 and 12 so that the composite structure provides grain strength in the X, Y and Z directions with grain strength in the X direction provided by wood veneer sheet 10, grain strength in the Y direction provided by wood veneer sheet 12, and grain strength in the Z direction provided by core sheet 16.

The use of the invention wood sandwich structure in the formation of a boat hull is illustrated in FIG. 6. A female mold 28 of fiberglass or the like is provided to supply the basic hull configuration. Mold 28 is preferably suitably journaled as at 30 so as to allow the mold to be pivoted so that hull may be built up in arcuate sections with maximum gravity assist being provided for each of the several arcuate sections by selective rotation of the mold about pivot 30. For example, and as shown, the boat hull may be built up in four equal 45° arcuate sections with the mold being tilted after completion of each section to bring the next section into a position providing maximum gravity assist.

To form the boat hull, a plurality of strakes are placed adjacent the mold surface with the strakes running generally parallel to the longitudinal center line of the hull so that the grain of the strakes extends generally parallel to the hull center line. Separation strips 26 are positioned between adjacent strakes and the strips and strakes may be temporarily secured in position against the mold surface by the use of double sided masking tape. After the strakes and strips constituting a particular arcuate section of the hull have been positioned against the mold, epoxy resin is applied to the exposed inner surfaces of the strakes and strips whereafter a wood veneer sheet 12 is placed adjacent the strakes with the grain of sheet 12 extending generally at cross angles with respect to the grain of the strakes. Another layer of resin is now applied to the exposed inner surface of sheet 12 and a sheet of fiberglass 14 is placed adjacent the exposed inner surface of sheet 12. Another layer of resin is now applied to the exposed inner surface of fiberglass sheet 14 and a sheet 16 of end core balsa wood is placed adjacent the exposed inner surface of fiberglass sheet 14 with the end grain of the balsa wood sheet running in a direction normal to the grain of wood veneer sheet 12 and normal to the grain of strakes 24. A further layer of resin is now applied to the exposed inner surface of end grain balsa wood sheet 16 and a further sheet of fiberglass 18 is positioned adjacent the exposed inner surface of balsa wood sheet 16. The various sheets are now pressed together by the use of weights such as sandbags 32 or the like to allow the epoxy to initially cure.

Alternatively, less than all of the sheets may be pressed together and allowed to initially cure, whereafter the remainder of the sheets may be applied to the initially cured sheets and pressed together. For example, sheets 10, and 12 may be positioned and pressed together and allowed to initially cure, whereafter sheets 14, 16 and 18 may be added and pressed together. When using the identified epoxy resin and hardener, the initial cure, whether of some or all of the sheets, will take approximately 20 minutes, whereafter the weights may be removed to allow a full cure which will occur after 8 to 10 hours. Following the full cure of all of the sheets, the boat hull may be removed from the mold 28 and a coating of resin 22, formed of the same resin as the resin layers 20 interposed between the various sheets, may be applied to the exterior surface of the strakes 24 and the strips 26 to provide a moisture seal for this exterior surface. Since the identified epoxy resin is clear, the resin seals the exterior surface of the hull while preserving the natural wood appearance. Alternatively, the boat hull may be formed in the mold consisting of sheets 12, 14, 16, and 18 and the strakes 24 and strips 26 may be applied to the exposed surface of wood veneer sheet 12 after the hull has been removed from the mold.

If desired, a veil coat 34 of fiberglass cloth may be applied over coating 22 and a further resin coating 36 applied to the exposed surface of fiberglass veil coat 34. Fiberglass cloth 34 may have a thickness of 0.005 inches and becomes transparent when wetted. Cloth 34 toughens the exterior surface of the hull to provide impact resistance and adds overall strength to the hull.

The resulting board hull is extremely stress resistant in all directions, provides a superior stiffness-to-weight ratio and a superior strength-to-weight ratio, and preserves the sought after appearance and "feel" of a wood hull while substantially eliminating the moisture problems inherent in previous wood hull designs. The invention board hull also lends itself to mass production technique since all of the reusable mold techniques that have allowed volume low cost production of fiberglass hulls are equally applicable to the construction of the composite wooden hull of the invention.

When used to form a boat hull, the wood sandwich composite structure of FIGS. 4–6 may, for example, have an overall thickness of 0.75 inches with each wood veneer sheet comprising a thickness of 0.0625 inches, each fiberglass sheet comprising a thickness of 0.0500 inches, the end grain balsa core sheet having a thickness of 0.4800 inches, and the various layers of resin together comprising a thickness of 0.045 inches. These thicknesses are of course not critical nor limiting but these particular thicknesses have been found to produce a superior structure, especially when applied in a boat building environment.

The invention is seen in FIG. 7 as applied to the formation of convavo-convex structures such, for example, as a boat hull. As seen in FIG. 7, a sheet of wood veneer 38 may be placed adjacent the inner surface of mold 28 whereafter a layer of epoxy resin 40 may be applied to the exposed inner surface of the wood veneer sheet 38 whereafter a sheet of fiberglass 42 may be placed adjacent the exposed inner surface of wood veneer sheet 38 and a suitable curing technique employed to allow the wood veneer sheet 38, resin 40 and fiberglass sheet 42 to set up to form a rigid, laminate, concavo-convex structure 44. In concavo-convex structure 44, the wood veneer sheet forms the rounded exterior of the structure to provide a wooden appearance to the structure and the fiberglass sheet forms the concave interior of the structure and reinforces the wood veneer to form, together with the wood sheet, an attractive and yet extremely strong concavo-convex structure.

Figure 9:
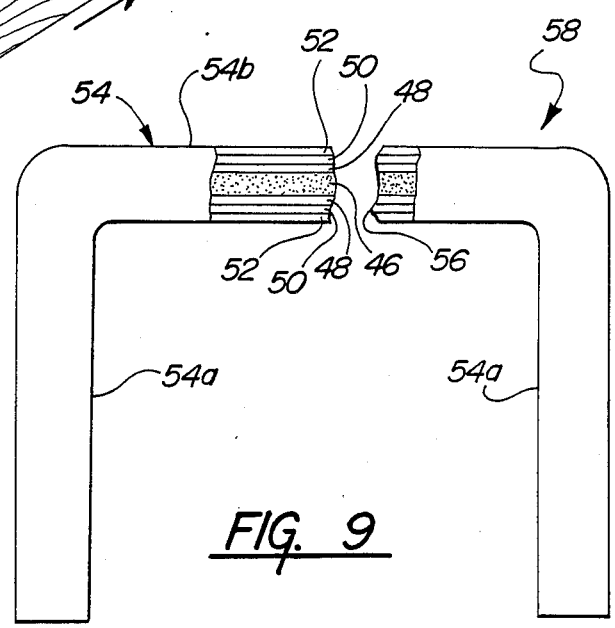
FIG. 9 is a fragmentary view of a desk embodying the wood sandwich structure of FIG. 8.

The wood sandwich structure as seen in FIGS. 8 and 9 is especially suited for use in furniture manufacture. The structure of FIGS. 8 and 9 comprises a central sheet of end core material 46; a sheet of processed material 48 resin bonded to each face of core sheet 46; a wood veneer sheet 50 resin bonded to each sheet 48 of processed material, and a second wood veneer sheet 52 resin bonded to each sheet 50 of wood veneer with the grain of each sheet 52 crossing with respect to the grain of the associated sheet 50. The resulting wood sandwich structure 54, including interposed layers of resin 56, has total symmetry and is therefore extremely resistant to warpage. Structure 54 also includes the X, Y and Z strength as described in connection with the structures of FIGS. 4–6 and synergistically combines the tensile strength provided by the strands or cables of the processed material, the compressive strength provided by the wood veneer sheets and the unity strength provided by the bonding and penetrating effects of the resin. Structure 54 in fact is significantly stronger than comparable wood or wood veneer structures or comparable processed sheet or composite processed sheet structures.

Figure 10:
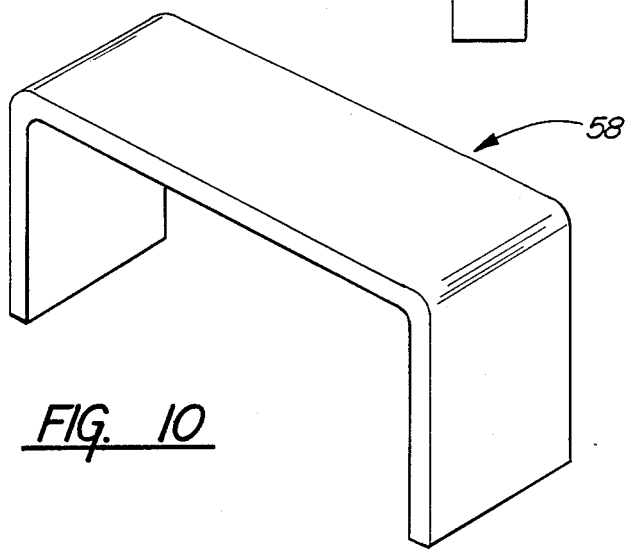
FIG. 10 is a perspective view of the desk of FIG. 9.

Structure 54 is seen in FIGS. 9 and 10 employed to form a desk 58. Specifically, a single continuous composite strip of wood sandwich structure 54 is suitably formed into a U configuration with the legs of the U comprising the legs 54a of the desk and the bight of the U comprising the top 54b of the desk. Wood sandwich structure 54 is especially well suited for furniture application because of its extreme resistance to warpage, excellent stiffness and overall strength, and extreme resistance to any of the moisture problems that have traditionally plagued natural wood structures. Central core member 46 preferably comprises a sheet of end core balsa; processed sheets 48 preferably comprise sheets of triaxial fiberglass; sheets 50 and 52 preferably comprise sheets of a hardwood such as cherry or oak; and resin 56 preferably comprises WEST SYSTEM 105 Epoxy Resin and WEST SYSTEM 205 Hardener.

Although preferred embodiments of the invention have been illustrated and described in detail, it will be apparent that various changes may be made in the disclosed embodiments without departing from the scope or spirit of the invention.

I claim:

1. A method of remanufacturing wood comprising the steps of:
   A. peeling a bolt of natural wood in spiral form to form a web of wood veneer;
   B. forming the wood veneer web into a first plurality of sheets of uniform size;
   C. forming a second plurality of sheets, each having a size and thickness approximately the size and thickness of said wood veneer sheets, said second plurality of sheets comprising at least one sheet of fiberglass and at least one sheet of core material having a grain strength running in a direction generally normal to the plane of that sheet; and
   D. intermixing said wood veneer sheets and said second plurality of sheets while interposing resin between said intermixed sheets to form a wood sandwich structure comprising a sheet of core material with a sheet of fiberglass resin bonded to each face of said sheet of core material and a sheet of veneer resin bonded to the exposed face of each sheet of fiberglass.

2. A method according to claim 1 wherein:
   E. said sheets are intermixed to provide another sheet of wood veneer resin bonded to the exposed face of each sheet of wood veneer resin bonded to the fiberglass sheet; and
   F. the juxtaposed sheets of wood veneer are arranged with their grains crossed with respect to one another.

3. A method according to claim 2 wherein said sheet of core material comprises a sheet of end core balsa.

4. A method of forming a boat hull comprising:
   (A) forming a non-planar mold having a configuration conforming to the desired shape of the boat hull;
   (B) placing a sheet of wood veneer into contoured contact with the mold surface;
   (C) applying the resin to the exposed surface of said wood veneer sheet;
   (D) placing a sheet of fiber reinforced polymeric material into contoured contact with said wood veneer sheet;
   (E) applying a resin to the exposed surface of said sheet of the fiber reinforced polymeric material;
   (F) placing a sheet of core material into contoured contact with said sheet of fiber reinforced polymeric material, said core having a structural strength running in a direction generally normal to the plane of said sheets; and
   (G) allowing said resin to cure to bond said sheets together and form a composite boat hull conforming in shape to the shape of said mold.

5. A method according to claim 4 including the further steps of:
   J. applying a resin to the exposed surface of said sheet of core materials; and
   K. placing a further sheet of fiber reinforced polymeric material into contoured contact with said sheet of core material.

6. A method according to claim 5 wherein:
   L. following said curing step, said hull is removed from said mold, resin is applied to the exposed outer surface of said wood veneer sheet, and a plurality of strakes of a wood veneer material are positioned adjacent the exposed outer surface of said wood veneer sheet with the strakes extending generally parallel to the longitudinal center line of the hull and the grain of the strakes extending at cross angles with respect to the grain of said wood veneer sheet.

7. A method of forming a veneer laminate composite structure comprising the steps of:
   A. placing a first sheet of wood veneer into contoured contact with a non-planar mold surface with the grain of the sheet extending generally in the plane of the sheet;
   B. applying a resin to the exposed surface of said sheet of wood veneer;
   C. placing a second sheet of wood veneer into contoured contact with said first sheet with the grain of the second sheet extending generally in the plane of the first sheet but at cross angles with respect to the grain of said first sheet;
   D. applying a resin to the exposed surface of said second sheet;
   E. placing a sheet of fiber reinforced polymeric material into contoured contact with said second wood veneer sheet;
   F. applying a resin to the exposed surface of said sheet of fiber reinforced polymeric material;
   G. placing a sheet of core material into contoured contact with said sheet of fiber reinforced polymeric material, said sheet of core material having a structure strength running generally normal to the plane of its sheet; and
   H. allowing said resin to cure to form a laminate composite structure conforming in shape to the shape of the mold.

8. A method according to claim 7 wherein:
   I. a resin is applied to the exposed surface of said sheet of core material; and
   J. a second sheet fiber reinforced polymeric material is placed adjacent said sheet of core material.

9. A method according to claim 8 wherein:
   K. said sheets are pressed together during the curing process.

10. A method according to claim 8 wherein:
    K. said resin is a clear liquid epoxy resin;
    L. after the aforesaid resins have cured the veneer laminate composite structure is removed from said mold surface and a coating of resin is applied to the surface of said first wood veneer sheet previously in contact with said mold surface to seal that surface while preserving the natural wood appearance.

11. A method according to claim 8 wherein:
    K. said sheets of fiber reinforced polymeric material comprise fiberglass sheets; and
    L. said sheet of core material comprises a sheet of end grain balsa wood.

12. A method of forming a boat hull comprising:
    (A) forming a mold having a configuration conforming to the desired shape of the boat hull;
    (B) placing a plurality of strakes of a wood veneer material adjacent the mold surface with the strakes extending generally parallel to the longitudinal center line of the hull and the grain of the strakes extending generally in the plane of the strakes;
    (C) applying a resin to the exposed surface of said strakes;

(D) placing a sheet of wood veneer adjacent said strakes with the grain of the sheet extending generally in the plane of the sheet but at cross angles with respect to the grain of said strakes;

(E) applying a resin to the exposed surface of said wood veneer sheet;

(F) placing a sheet of fiber reinforced polymeric material adjacent said wood veneer sheet;

(G) applying a resin to the exposed surface of said sheet of fiber reinforced polymeric material;

(H) placing a sheet of core material adjacent said sheet of fiber reinforced polymeric material, said core having a structural strength running in a direction generally normal to the plane of said sheets.

(I) allowing said resin to cure to bond said sheets together and form a composite boat hull conforming in shape to the shape of said mold.

13. A method according to claim 12 and including the further steps of:

J. applying a resin to the exposed surface of said sheet of core material; and

K. placing a further sheet of fiber reinforced polymeric material adjacent said sheet of core material.

14. A method according to claim 13 wherein:

L. said resin comprises a clear liquid epoxy resin; and

M. following said curing step, said hull is removed from said mold and a coating of said resin is applied to the exposed surfaces of said strakes to seal those surfaces while preserving the natural wood appearance.

15. A method according to claim 14 wherein:

N. said sheets of fiber and 29 material comprise fiberglass sheets; and

O. said sheet of core material comprises a sheet of end grain balsa wood.

* * * * *

UNITED STATES PATENT AND TRADEMARK OFFICE
CERTIFICATE OF CORRECTION

PATENT NO. : 4,931,124

DATED : June 5, 1990

INVENTOR(S) : Charles S. Baum

It is certified that error appears in the above-identified patent and that said Letters Patent is hereby corrected as shown below:

TITLE PAGE:
IN THE ABSTRACT:

Please replace the abstract with the following:
--A method of forming a wood sandwich structure comprising the steps of peeling a bolt of natural wood in spiral form to form a web of wood veneer; forming the wood veneer web into a plurality of sheets of uniform size; forming a plurality of fiberglass sheets having a size corresponding to the size of the wood veneer sheets; and bonding alternate sheets of wood veneer and fiberglass together with a resin to form a remanufactured wood composite sandwich structure comprising alternate sheets of wood veneer and fiberglass bonded together by the resin. Also disclosed is a specific wood sandwich structure for use in boat building; another specific wood sandwich structure especially suitable for use in furniture building; a method of forming a boat hull utilizing a wood sandwich structure according to the invention; and a method of forming furniture utilizing a wood sandwich structure according to the invention--.

UNITED STATES PATENT AND TRADEMARK OFFICE
CERTIFICATE OF CORRECTION

PATENT NO. : 4,931,124

DATED : June 5, 1990

INVENTOR(S) : Charles S. Baum

It is certified that error appears in the above-identified patent and that said Letters Patent is hereby corrected as shown below:

Column 2, line 28, "boating" should be --boat--.

Column 3, line 12, "warpge" should be --warpage--.

Column 6, line 61, "strakes are" should be

--strakes 24 are--.

Column 7, line 55, "board" should be --boat--.

Column 7, line 61, "board" should be --boat--.

Column 7, line 61-62, "technique" should be --techniques--.

Column 8, line 35, "material," should be --material;--.

Column 9, line 14, "approximately" should be --approximating--.

Column 9, line 50, "of the fiber" should be --of fiber--.

Column 10, line 40, "sheet fiber" should be --sheet of fiber--.

Signed and Sealed this

Sixteenth Day of July, 1991

Attest:

HARRY F. MANBECK, JR.

Attesting Officer  Commissioner of Patents and Trademarks